(12) United States Patent
Shipman

(10) Patent No.: US 6,337,119 B1
(45) Date of Patent: Jan. 8, 2002

(54) PRODUCTION OF SMOOTH SUPPORTING SURFACES FOR DATA BEARING FILMS

(75) Inventor: Vern D. Shipman, Garland, TX (US)

(73) Assignee: Headway Research, Inc., Garland, TX (US)

(*) Notice: Subject to any disclaimer, the term of this patent is extended or adjusted under 35 U.S.C. 154(b) by 0 days.

(21) Appl. No.: 08/393,113

(22) Filed: Feb. 21, 1995

Related U.S. Application Data

(63) Continuation-in-part of application No. 08/129,343, filed on Sep. 30, 1993, now abandoned.

(51) Int. Cl.[7] ................................................. B32B 3/02
(52) U.S. Cl. ...................... 428/64.2; 427/264; 427/265; 427/266; 427/269; 427/270; 427/271; 427/287; 427/388.1; 427/389.7; 427/407.2; 427/409; 427/412.1; 427/435; 427/443.2; 427/510; 427/512; 427/558; 427/559; 427/595; 428/414
(58) Field of Search .................................. 427/510, 559, 427/512, 595, 558, 264, 265, 266, 269–271, 287, 388.1, 389.7, 407.2, 409, 412.1, 435, 443.2, 64.2, 414

(56) References Cited

U.S. PATENT DOCUMENTS

| | | | |
|---|---|---|---|
| 390,611 A | * 10/1888 | McHugh | 427/270 |
| 1,691,708 A | * 11/1928 | Egleson | 427/271 X |
| 1,983,720 A | * 12/1934 | West | 427/271 X |
| 4,619,804 A | 10/1986 | Leonard et al. | 264/220 |
| 4,746,568 A | * 5/1988 | Matsumoto et al. | 427/270 X |
| 4,968,370 A | 11/1990 | Watkins | 156/232 |
| 5,188,863 A | 2/1993 | de Graaf et al. | 427/512 |

* cited by examiner

Primary Examiner—Bernard Pianalto
(74) Attorney, Agent, or Firm—Dennis T. Griggs

(57) ABSTRACT

Master discs and similar devices used in the production of digital data storage and recording discs and the like are produced with a substrate member which is provided with a layer of material which is applied to the substrate member in liquid form of a thickness greater than the surface roughness of the substrate member and of a thickness greater than any particulates present on the substrate member. The material layer is preferably a polymer such as epoxy, acrylic or styrene and is hardenable by exposure to UV light, heat, air circulation or catalytic reaction to provide a substantially smooth flat surface for receiving a data bearing film. The film may be treated to generate bumps or pits representing digital signals, for example, which are free of any defects resulting from surface roughness or contamination of the substrate member. The substrate member may be more easily cleaned and reused without concern for its surface condition thereby reducing costs associated with manufacturing large quantities of digital data recording and storage devices.

18 Claims, 2 Drawing Sheets

PRODUCTION OF SMOOTH SUPPORTING SURFACES FOR DATA BEARING FILMS

CROSS-REFERENCE TO RELATED APPLICATIONS

This application is a continuation-in-part of application Ser. No. 08/129,343, filed Sep. 30, 1993 now abandoned.

FIELD OF THE INVENTION

The present invention is related generally to the production of a smooth, clean surface for receiving a data bearing film or coating used in conjunction with the manufacture of machine readable data storage or recording devices such as compact discs and the like.

BACKGROUND OF THE INVENTION

The proliferation of digitally recorded data of many types, including information, audio and video signals has created a substantial industry in the production of data recording and storage devices including those commonly known as compact discs or CDs, video discs, CD ROMs and other devices. Typically, these data storage discs are manufactured of a polymer material which is molded by a metal master device, commonly known as "stamper", to create machine readable digital data logic surfaces on data storage discs such as compact discs.

The stamper is a metal part which forms a part of an injection mold. The stamper carries complement logic surface portions (either pits or bumps) and is inserted into the mold cavity to become one side of the cavity. The stamper is electro-formed from a "mother", which is a metal part electroformed from a "father". The father is the first electroformed metal part made from a "glass master". The glass master is a medium on which data is recorded as the first step leading to the replication process. The glass master is of a glass disc larger than the replicated product disc, and is coated with a photosensitive material on which the data are recorded by a laser beam recorder. The replicated product discs, for example compact discs or video discs, are replicated from the stamper.

The creation of the metal master (father) and its replications requires careful attention. For example, data recording or storage devices or compact discs (CDs) are usually optically read to transfer the stored data to a machine which is capable of manipulating the resultant signals for one purpose or another. The minute surfaces which are generated on the data storage "CD" must be produced to very close dimensional tolerances in order to effect accurate transfer of the signal or stored data to the reading device which typically utilizes a reflectable light or laser beam. Accordingly, careful attention is paid to the production of the metal master (father) which is used to produce the data storage discs. This careful attention has resulted in the development of fairly complex processes for producing the master discs or devices to be sure that there are no surface imperfections which could result in the production of erroneous data or information on the production copies of the data storage discs. There have been continuing problems and inefficiencies in the manufacture of master discs which are substantially overcome by the present invention.

DESCRIPTION OF THE PRIOR ART

Common practice in the production of master discs for producing CDs or similar data storage devices includes the use of a glass, plastic or metal plate, generally of larger diameter than the "end product" data storage disc and which serves as a substrate or support member for a thin data bearing film or coating. This film is then treated to provide surface geometries, either pits or bumps, which are replicated in the metal master disc (stamper) described above. Although the glass, plastic or metal substrate member is often referred to as a "master", it is actually a supporting substrate for the data bearing film which is used to create the metal master disc that is used in molding the production data storage or recording discs.

A substantial problem in the application of data bearing films is that of maintaining the surface quality and cleanliness of the substrate member. The film support surface of the substrate member must be flat in the area where data will be recorded and, particularly smooth and void of any surface roughness or imperfections. For example, the data bearing film that will be applied to the substrate surface is generally about 1500 to 1600 Angstroms in thickness. Tiny logic "pits" or "bumps" are then produced on the data bearing film and are typically sub-micron in width. Consequently, even a small scratch or particle disposed on the surface of the substrate member can destroy a large area or several tracks of data. It is not difficult to damage or scratch the substrate surface or contaminate the surface to provide a roughness of five microns or more. The human eye cannot detect a five micron particle or surface imperfection.

Accordingly, the production of the substrate member for supporting the data bearing film is expensive and favors the cleaning and recycling of the substrate members in the interest of economics in the production of data storage or recording devices. The original acquisition cost of glass substrate members requires that they be reused until the surface condition is completely unacceptable. Of course, the recycling process must cost less than the original cost of the substrate member itself. The average yield in producing so-called master discs by current methods using a glass substrate member and a data bearing film applied thereto is generally less than 90% and may be substantially less if production demand is high for the end product data storage disc. The yield may vary from day to day according to personnel variances and environmental changes.

Another problem associated with the use of the above-mentioned substrate members is that the commonly used data bearing films or coatings have poor adhesion characteristics to the substrate member support surface. This requires that an adhesion layer be applied to glass substrate surfaces, in particular, before the data bearing film is applied. The adhesion promotion material is generally spin-coated onto the substrate member. Hexamethyldisilane (HMDS) is a commonly used adhesion promoting material for data bearing films. It is an expensive chemical, difficult to apply and to remove when recycling the substrate member and a waste disposal problem. Moreover, the process of applying the adhesion promoting layer to a substrate member also increases the risk of contamination of the substrate surface with particles that can damage the surfaces of the data bearing film.

Notwithstanding the problems of contaminating the surface of the substrate member with a film adhesion promotion material, the substrate member, during its reclamation process, is typically soaked in hot nitric acid, cleaned by ultrasonically activated detergents, rinsed multiple times in a solution of alcohol and deionized water, and often a final rinse in alcohol together with drying by hot fluorocarbon gasses. Moreover, if a surface has been damaged in any way it must be mechanically repolished and recleaned. Clearly, the facilities and material requirements for processing or recycling these data bearing film substrate members are significant and require careful attention to employee training, handling of volatile and toxic fluids, and is a significant cost factor in the production of digital data storage or recording devices.

SUMMARY OF THE INVENTION

The present invention provides improved methods and means used in connection with the production of data bearing films, including those films used to manufacture master discs and similar devices for the production of data storage and recording devices, including those commonly known as compact discs or CDs, CD ROMs and laser video discs.

In accordance with one aspect of the present invention, a method for preparing a substrate for receiving a data bearing film has been developed wherein a substrate member is coated with a layer of a hardenable resin which provides a flat, smooth, substantially defect free surface and to which a data bearing film or coating may be directly applied without contamination or the development of surface imperfections on the data bearing film.

In accordance with another aspect of the invention, a method has been developed for preparing data bearing films for receiving a layer of metal to produce the father disc from which the mother and stamper (children) discs are electroformed for data storage disc manufacturing processes wherein a master substrate member is provided which may be coated with a layer of material which will fill surface imperfections in the substrate member, and encapsulate particulates and other contaminants on the substrate surface so that they cannot interfere with the data bearing film layer and which enables the master substrate member to be reused with substantially reduced reclamation and preparation costs.

In accordance with yet a further aspect of the present invention, a method is provided for conditioning a substrate member for receiving a data bearing film or coating wherein minimal exposure to contaminants is obtained, where the overall process of preparing the data bearing film and manufacturing the master disc is simplified and may be carried out in a clean environment. Accordingly, the overall cost for producing high quality masters for the production of data recording and storage elements or CDs is substantially reduced.

The present invention still further provides an improved substrate member for receiving a data bearing film which is substantially free of surface imperfections, may be conveniently reused with minimal recycling or reprocessing costs, and is adapted to provide for an improved method of manufacturing so-called master discs for generating production data recording and storage devices.

Those skilled in the art will appreciate the above-mentioned advantages and superior features of the invention together with other important aspects thereof upon reading the detailed description which follows in conjunction with the drawings.

DESCRIPTION OF PREFERRED EMBODIMENTS

Figure 1:
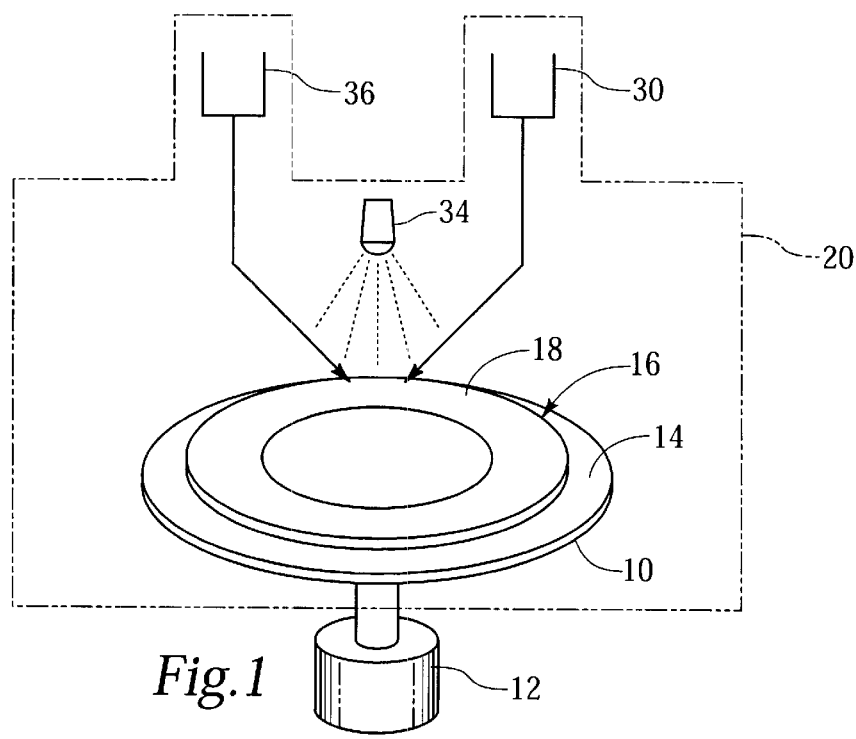
FIG. 1 is a schematic diagram showing one embodiment of a method and system for producing substantially error free data bearing films in accordance with the invention.

In the description which follows, like elements are marked throughout the specification and drawing with the same reference numerals, respectively. The drawing figures are not intended to be to scale in all respects and several features are shown in generalized or somewhat schematic form in the interest of clarity and conciseness.

Referring to FIG. 1, there is shown a schematic diagram of an improved method for the production of data bearing films in accordance with the invention. Such data bearing films are preferably used to manufacture a so-called master member or disc used for the production of large numbers of data storage or recording elements commonly known as compact discs or CDs, for example. In FIG. 1, there is illustrated a generally cylindrical platen or turntable 10 which may be rotated by suitable motor means 12 at a selected rotative speed. The turntable 10 is substantially flat and normally oriented in a horizontal plane thereby defining a horizontal flat surface 14 for supporting a unique substrate member in accordance with the invention and generally designated by the numeral 16. The substrate member 16, in one preferred embodiment, comprises a generally cylindrical glass or plastic plate having a flat top surface 18 and a parallel bottom surface 19, FIG. 2, engaged with the surface 14 of the turntable 10.

The aforementioned elements may be disposed in a substantially clean environment defined by an enclosure 20, which environment may be in accordance with standards for the manufacture of data bearing, storage or recording devices or certain semi-conductor devices, for example. The degree of cleanliness may be in accordance with standards accepted in the industry at the time of the present invention. Notwithstanding these cleanliness standards, the prior art processes for preparing substrate members for receiving a data bearing film have been complex, expensive, require substantial worker training and require the handling and disposal of several types of expensive and environmentally unfriendly materials. The substrate member 16 may be made of glass, a suitable polymeric material, or even metal. A glass or polymeric material is preferred for several reasons known to those skilled in the art. The substrate member 16 is shown disposed for the receipt of a unique layer of material which will provide for enhancing the surface quality of the substrate member 16 so that a data bearing film may be supported by the substrate member 16 substantially free of any defects which might interfere with the process of generating data recording or storage surfaces on the data bearing film.

Figure 2:
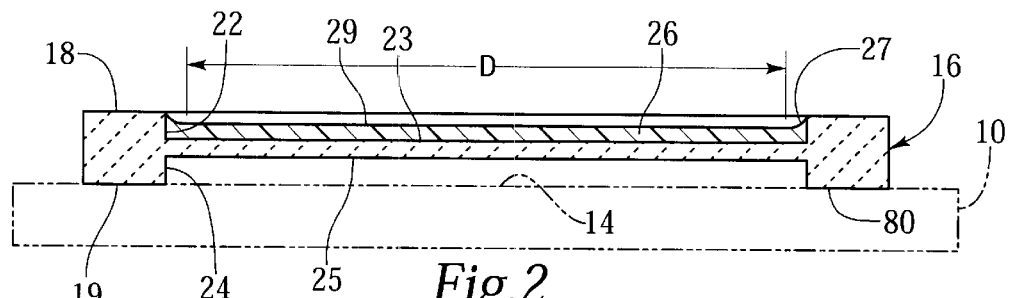
FIG. 2 is a section view of one embodiment of a substrate member with a surface enhancing material layer applied thereto in accordance with the invention.

In a preferred embodiment, the substrate member 16 is provided with opposed generally circular recesses 22 and 24 as shown in FIG. 2, in particular. Only one recess 22 or 24 may be provided in one of the opposed surfaces 18 or 19. However, it may be advantageous to provide the substrate member 16 with opposed recesses in the interest of minimizing the expense of reprocessing or reusing the substrate member. The recesses 22 and 24 are delimited by substantially smooth planar surfaces 23 and 25, respectively, on which an intermediate, smooth surfaced material layer or coating 26 may be disposed, as shown in FIG. 2. The layer 26 may be applied to the substrate member 16 as a liquid, such as a resin which is relatively quick hardening in response to exposure to ultraviolet light, for example. The material layer 26 may also be formed of a material which will harden in response to exposure to elevated temperature (heat), air circulation, or in response to a catalytic reaction resulting from a mixture of two component fluid parts. Epoxy, acrylic and styrene polymers and water soluble materials may be used to form the layer 26.

According to an alternative embodiment, the smooth surfaced material layer 26 is formed by applying a molten liquid which melts only at a significantly higher temperature (for example 300° F. for glass having sodium lime content) than the highest processed temperature (typically 110° C.) that the data bearing film is exposed to, but a temperature which is significantly less than the melting temperature of the substrate member 16, for example 800° F. for high borosilicate glass. After the intermediate, smooth surfaced liquid layer 26 is deposited, it is permitted to harden by cooling at ambient temperature. Examples of suitable molten liquid materials for forming the intermediate, smooth surfaced material layer 26 include thermofluid plastics, high melting temperature waxes and low melting temperature glass. Recovery/restoration of the substrate member 16 is accomplished simply by spinning the substrate in a hot chamber at a temperature above the melting temperature of the surface layer 26, and flushing the surface with new or fresh melt material until it is clean and recoated. After it cools and hardens, the material layer 26 on the substrate member 16 is ready to receive a new data sensitive film.

The material layer 26 is formed by depositing one of the aforementioned materials in liquid form onto the substrate member 16, preferably within the enclosure 20 from a suitable source 30, FIG. 1, which source is also preferably not exposed to the ambient atmosphere. The deposition of the fluid which will form the layer 26 may be carried out while rotating the turntable 10 at a selected speed to provide for a uniform deposition and spreading of the material onto the surface 23. The amount of material may be metered to prevent it from overflowing the recess 22 and the surface tension of the material may form a meniscus 27 at the edges of the recess, as shown in FIG. 2.

In this regard, the diameter of the recess 22 may be made suitably large to provide a substantially flat smooth surface within the confines of a circle of diameter D1, FIG. 2. The recesses 22 and 24 may, for example, be up to about 0.025 inch deep by 6.0 inches in diameter for compact discs, and about 0.025 inch deep by 12–14 inches in diameter for video discs. The material dispensed onto the surface 23 from the source 30 is preferably in liquid form and in the embodiment being described will be metered to substantially fill the recess 22 without overflow onto the surface 18. The turntable 10 may or may not require rotation during application of the layer 26 to the substrate member 16, depending on the viscosity of the material and curing time, for example. However, rotation or spinning of the substrate member 16 may assist in achieving uniform distribution of the material onto the surface 23.

It may be practical to use materials having a very wide range of viscosity for the fluid which produces the material layer 26. It is contemplated that the viscosity may range from near 1.0 centipoise up to that of "cool honey". The thickness of the layer 26 may range from 0.001 inches up to 0.060 inches and must be greater than the roughness of the surface 23 and the maximum particle size allowed within the clean room or enclosure 20. It is preferable that the material forming the layer 26 be capable of transmitting or absorbing electromagnetic radiation in wavelengths used for "writing data", now commonly about 400 to 500 nm, with minimal reflections for example at 457.9 nm. Reflection of "nonwriting" wavelengths is acceptable, and could be beneficial for autofocusing lasers which would have a wavelength typically of up to 780 nm or longer.

One material which substantially meets the above-mentioned requirements for the layer 26 is commercially available under the trademark UNICAST ENCAPSULANTS from Emerson and Cuming, a unit of W. R. Grace Company, or with materials compounded by DSM Desotech, a company specializing in this type of material. These materials are curable to a hardened state by exposure to ultraviolet light and may be deposited on the substrate member 16 in the manner shown and described in conjunction with FIG. 1. The substrate member 16 may or may not require rotation. Alternatively, the substrate member 16 might be dipped into a container of the ultraviolet curable material described above.

As shown in FIG. 1, a source of (UV) light 34 is disposed so as to rapidly cure, i.e. harden, the fluid forming the layer 26 after it is uniformly disposed on the substrate member 16. Once the layer 26 has been deposited on the substrate member 16 and cured in accordance with the above-described method, a substantially flat, smooth surface 29, FIG. 2, is provided which is free of defects caused by surface roughness of the substrate member surface 23 or any contaminating particles disposed thereon. After formation of the smooth, flat, solid surface 29, a data bearing film may be applied thereto from a source 36 also protected from exposure to contamination such as by being within the enclosure 20, as shown in FIG. 1. Deposition of the data bearing film may be carried out while rotating the turntable 10, for example. Alternatively, the substrate member 16 may be moved to another station or position for receiving the data bearing film.

Figure 3:
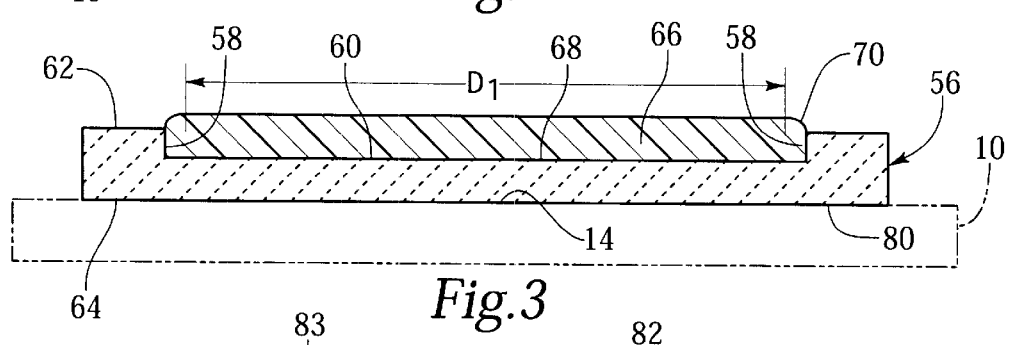
FIG. 3 is a section view of a first alternate embodiment of a substrate member and surface enhancing material layer applied thereto.
Figure 4:
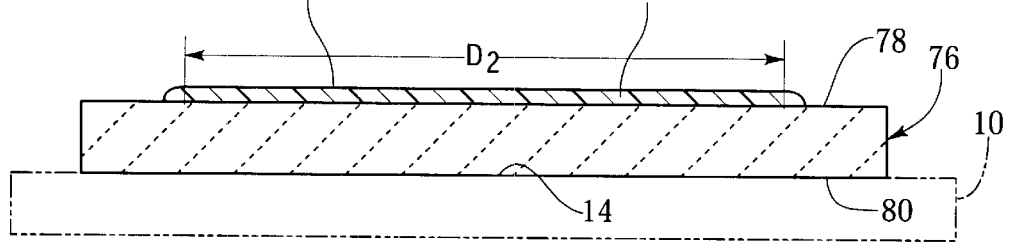
FIG. 4 is a section view of a second alternate embodiment of a substrate member and surface enhancing material layer applied thereto.
Figure 5:
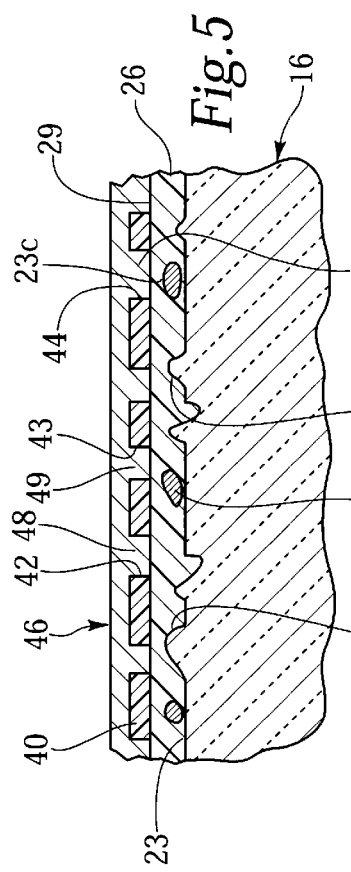
FIG. 5 is a detail section view showing a portion of a substrate member, surface enhancing layer, and data bearing film overlying the surface enhancing layer.

Attention is now directed to FIG. 5 which shows a detail section taken in the same plane as the views of FIGS. 2, 3 and 4, and showing a portion of the substrate member 16 and a portion of the surface 23, including surface imperfections or roughness 23a and 23b, for example. Moreover, microscopic particulates 23c are illustrated disposed on the surface 23. However, by providing the layer 26 of smooth surface forming material, having a thickness as described above, and as illustrated in FIG. 5, the surface 29 is free of imperfections caused by the roughness 23a, 23b or the particulates 23c. Accordingly, a data bearing film 40, as shown in FIG. 5, may be applied to the surface 29 without fear of being subject to imperfections in its thickness caused by the surface roughness 23a or 23b or the particulates 23c.

It is contemplated that conventional data bearing films or coatings presently used in the manufacture of metal master discs or stampers may be used in conjunction with the material layer 26, will suitably adhere thereto and may be applied to the surface 29 after curing or hardening of the layer 26. The data bearing film or coating 40 may be an ablative material subject to penetration by a laser light beam which will generate only holes or pits in the case of ablative film material. The film 40 may range in thickness from about 0.10 microns to 1.0 microns. Alternatively, the data bearing film 40 may be a photo sensitive material also provided in a thickness of 0.10 microns to 1.0 microns.

The film 40 may be suitably penetrated by a laser light beam to form plural pits or holes 42, 43, 44, FIG. 5, which represent digital logic values in accordance with known technology. The film 40 may then have applied thereto a layer 46 of metal, such as nickel or silver, by conventional electroforming methods and which may be built up to a thickness such that it may be removed from the film 40, or alternatively, the film 40 may be chemically dissolved or etched away leaving the father member 46 with bumps 48, 49 and 50 which represent complement logic data values. The father member or layer 46 may be suitably mounted on a support or have its thickness built up by electroforming to be used in the fabrication of the mother intermediate and the stamper or master disc for injection molding the final product.

Referring now to FIG. 3, there is shown an alternate embodiment of the substrate member generally designated by the numeral 56. The substrate member 56 has a generally cylindrical recess 58 forming a planar circular surface 60 which is parallel to opposed surfaces 62 and 64 of the substrate member 56. An opposed recess (not shown) may be formed in the under surface 64, similar to that provided for the substrate member 16. A layer 66 of surface enhancing material is shown in the recess 58 and provides a substantially smooth, defect-free surface 68 upon curing or hardening of the material. The quantity of material providing the layer 66 and deposited in the recess 58 is in excess of the volume of the recess whereby the surface 68 is disposed generally spaced from or above the surface 62.

Surface tension of the material forming the layer 66 will provide some meniscus curvature 70 at the edge of the layer, but the diameter of the recess 58 may be such as to provide a suitable flat surface area within the confines of diameter $D_1$, FIG. 3. The material used for the layer 66 may also be deposited with or without spinning the substrate member 56 and may comprise one of the aforementioned curable materials such as an epoxy resin, acrylics or acrylates, styrenes or water soluble resins to facilitate cleaning and recycling of the substrate member 56.

Referring now to FIG. 4, there is shown a second alternate embodiment of a substrate member 76 having opposed, generally flat parallel surfaces 78 and 80. A layer 82 of surface enhancing material is applied to surface 78 providing a flat, smooth surface 83 within a circle of diameter $D_2$ for application of a data bearing film thereto, upon hardening of the layer 82. The material layer 82 may be applied in the manner described above while spinning the substrate member 76. Alternatively, the substrate member may be held stationary while the fluid which will form the layer 82 is deposited on the surface 78 and allowed to flow outwardly from the deposition point, preferably the center of the substrate member.

Figure 6:
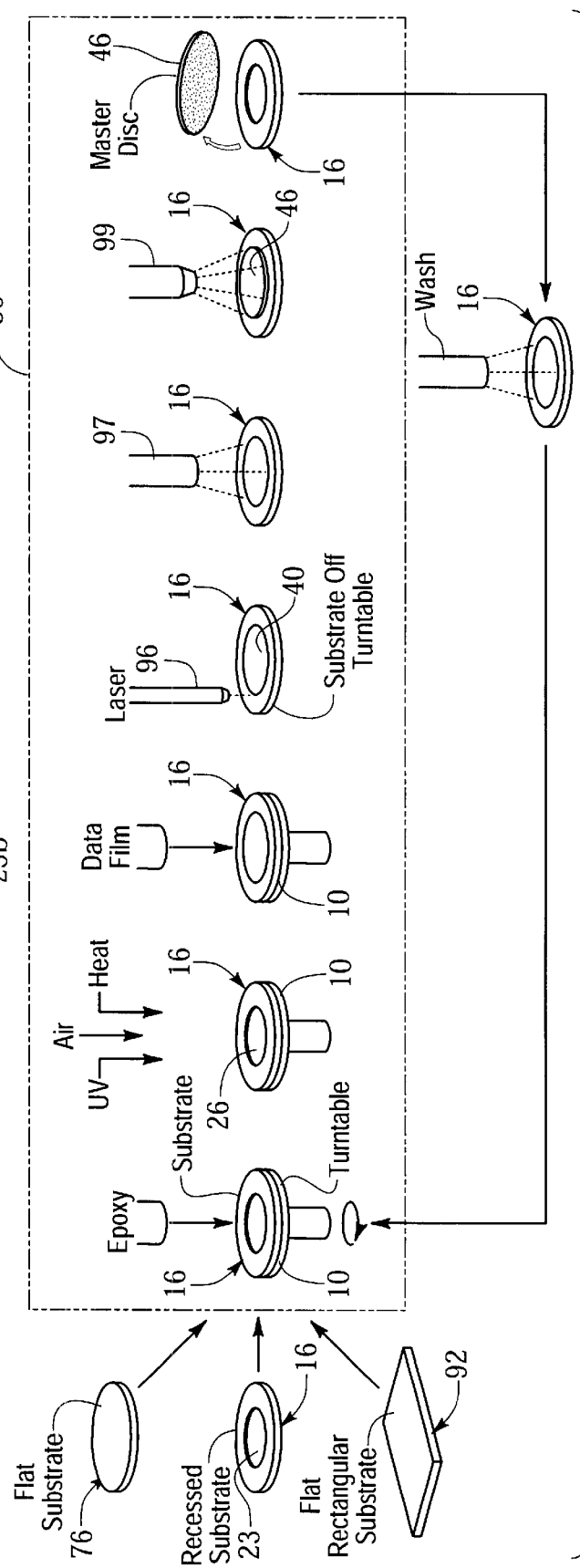
FIG. 6 is a schematic diagram showing certain steps for the provision of the data bearing film and the manufacture of so-called master discs for producing data storage discs, in accordance with the invention.

Referring now to FIG. 6, there is illustrated a diagram showing one set of preferred steps in preparing a data bearing film and a data bearing master element such as a (children) master disc or stamper used in generating multiple "production" data storage or recording discs. As shown in FIG. 6, the substrate members 16 or 76 may be prepared for placement on the turntable 10 shown disposed within a substantially clean enclosure 90. The enclosure 90 may be an entire room in which personnel can move within or the enclosure may be substantially smaller than that which could be occupied by operator personnel. The substrate member need not be cylindrical. A generally flat rectangular substrate member 92 is illustrated and which may be substituted for the substrate members 16 or 76. Of course, the substrate member 56 (FIG. 2) may also be utilized in the process.

After placement of the substrate member, such as the member 16 for example, on the turntable 10, it is rotated while the curable fluid which will form the surface enhancing layer 26, 66 or 82 is deposited on the substrate member. Uniform distribution of the fluid material over the entire working surface of the substrate member, such as the support surface 23, is enhanced by rotating the turntable 10 at a speed of about 10 RPMS to about 100 RPMs. After a sufficient quantity of the fluid is applied to the support surface 23 of the substrate member 16, for example, the curing process is carried out by the application of UV light, circulation of filtered air, heat or a catalytic reaction is allowed to take place. This operation may be done within the enclosure 90, as illustrated. Movement of the turntable 10 may not be required, depending on the viscosity of the fluid and the configuration of apparatus within the enclosure 90 for supporting the substrate member and performing other operations described and shown. Movement is illustrated in FIG. 6 in the interest of illustrating the steps in the overall process.

After application and curing of the smooth surface forming layer 26, the data bearing film 40 is applied to the surface 29, within the enclosure 90, without any intermediate steps, and this film is allowed to harden or cure typically by air drying. After curing of the data bearing film or coating, it is then embossed with logic data such as by the formation of logic pits by a laser beam emanating from a suitable beam generating device 96. This operation may be performed without removing the substrate member 16 and the layers of material supported thereby from the enclosure 90. After treating the data bearing film 40 to provide discrete logic surfaces corresponding to digital signals disposed thereon, the substrate member 16 is then brought into registration with means 97 for applying a nickel, silver or other suitable metal layer 46, for example, which will be built up to a sufficient thickness to allow removal of this layer in one piece from the data bearing film. The data bearing film 40 may then be chemically dissolved or washed away from the layer or member 46 by means 99, leaving the complement logic bumps or projections 48, 49, 50 formed on the member 46 which will be used during injection molding of the data storage devices.

During the last step which may be carried out within the enclosure 90, the master disc or member 46 is removed from the substrate member 16, as shown. The substrate member 16 may then be removed from the enclosure 90 or retained in the enclosure and suitably cleaned or washed to prepare it for receiving another surface forming layer of curable fluid. Thanks to the method of the invention and use of the aforementioned materials, minimal cleaning activity may be required of the substrate members 16, 56, 76 or 92.

Although all of the steps described above and illustrated in the drawing figures may be carried out in a "clean" room or an enclosure having a high degree of cleanliness in accordance with standards established for the manufacture of data bearing or data storage devices of the type described herein, or standards adhered to by the semiconductor manufacturing industry, for example, certain ones of the master disc removal and substrate cleaning steps may be performed outside of the clean environment.

Although preferred embodiments of the invention have been described above in some detail, those skilled in the art will recognize that various substitutions and modifications may be made to the data bearing film production methods and the improved film supporting substrate without departing from the scope and spirit of the appended claims.

What is claimed is:

1. A method for preparing a substrate member having a film layer that can be modified to define bumps or pits corresponding with true or complement logic digital data values comprising the steps of:
   providing a substrate member for supporting a data film layer;
   forming a recess in the surface of the substrate for receiving a quantity of viscous material;
   supplying a quantity of viscous material into the recess;
   causing said viscous material to harden in a layer having a substantially flat, smooth support surface for supporting a data film layer; and,
   depositing a data film layer onto the smooth support surface of the hardened layer in a thickness sufficient such that when the data film layer is exposed to a data recording step at least one of data bumps or pits can be formed on or in said data film layer.

2. The method set forth in claim 1 including the step of:
   rotating said substrate member while supplying said quantity of viscous material to provide substantially uniform distribution of said viscous material across the recess.

3. The method as set forth in claim 1 including the step of:
   supplying said viscous material as a molten liquid which melts only at a temperature which is significantly higher than the highest process temperature that a data film layer will be exposed to, but at a temperature which is sufficiently less than the melt temperature of the substrate member.

4. The method set forth in claim 1 including the step of:
   supplying said viscous material as a liquid in an amount which will not completely fill said recess.

5. The method set forth in claim 1 including the step of:
   supplying said viscous material as a liquid in an amount which will overfill said recess ba a predetermined amount.

6. The method set forth in claim 1 including the step of:
   supplying said viscous material into the recess in an amount sufficient to form a layer having thickness of from about 0.001 inch to about 0.060 inch.

7. The method set forth in claim 1 including the step of:
   supplying said viscous material of a liquid composition which is hardenable by exposure to ultraviolet light; and
   exposing said viscous material to ultraviolet light while the viscous material is in the recess.

8. The method set forth in claim 1 including the step of:
   providing said viscous material as a liquid of a composition which is hardenable in response to at least one of exposure to air circulation over said viscous material or exposure of said viscous material to heat while the viscous material is in the recess or mixing a catalytic activator with the viscous material.

9. The method set forth in claim 1 including the step of:
   removing said data film layer and hardened material from said recess and supplying a new layer of viscous material into the recess for supporting a new data film layer.

10. The method set forth in claim 9 including the step of:
    supplying said viscous material into the recess within an enclosure which is substantially void of particulates.

11. The method set forth in claim 1 wherein:
    said viscous material comprises of a polymeric composition selected from a group consisting of epoxies, styrenes and acrylics.

12. A method for providing a data film layer for producing a master disc for manufacturing multiple data storage and recording discs comprising the steps of:
    providing a substrate member;
    forming a cavity in the substrate member thereby defining a cavity floor;
    placing said substrate member in an enclosure which is substantially free of particulate matter;
    applying a layer of hardenable liquid material into the cavity and causing said liquid material to harden to form a substantially flat, smooth support surface;
    applying a data film layer to said support surface of a thickness sufficient such that when the data film layer is exposed to a data recording step at least one of bumps or pits can be formed on or in said data film layer for producing a master disc having complementary logic bumps or pits, said application of said data film layer being carried out without removing said substrate member from said enclosure; and
    exposing said data film layer to means for producing surface discontinuities in said data film layer in the form of at least one of either bumps or pits representing logic data to be transferred to a master disc.

13. The method set forth in claim 12 wherein:
    said layer of material has a thickness which exceeds the cavity floor surface roughness and the radial projection of any particulate matter disposed on the cavity floor surface.

14. The method set forth in claim 12 including the step of:
    causing said liquid material to harden into a layer of substantially solid material by exposing said layer of material to one of ultraviolet light, heat and circulation of a gas over said layer of material.

15. The method set forth in claim 12 including the step of:
    rotating said substrate member while applying said layer of liquid material into the cavity.

16. Means for producing a master recording disc or the like for the manufacture of data storage and recording devices, comprising:
    a substrate member having a substantially flat support surface formed thereon;
    a layer of hardened material disposed on said support surface and adhered thereto and of a thickness greater than the roughness of said support surface and any particulates present on said support surface, said layer of material being applied to said support surface in liquid form and caused to harden to provide a substantially flat, smooth support surface;
    said substrate member including a shallow recess defining said support surface and said layer of hardened material being disposed in said recess; and,
    a data bearing film disposed on said substantially flat, smooth surface of said layer and of a thickness sufficient such that when exposed to a data recording step at least one of bumps and pits may be formed in said film having a predetermined configuration unmodified by said support surface.

17. The apparatus set forth in claim 16 wherein:
    said layer of hardened material is selected from a group consisting of an epoxy polymer, an acrylic polymer and a styrene polymer.

18. The apparatus set forth in claim 16 wherein:
    said layer of hardened material is water soluble.

* * * * *